(12) United States Patent
Skaff et al.

(10) Patent No.: US 7,836,754 B1
(45) Date of Patent: Nov. 23, 2010

(54) CRYOGENIC FEED-THROUGH TEST RIG

(75) Inventors: Antony Skaff, Sandusky, OH (US); Daniel Schieb, Powell, OH (US)

(73) Assignee: Sierra Lobo Inc., Fremont, OH (US)

( * ) Notice: Subject to any disclaimer, the term of this patent is extended or adjusted under 35 U.S.C. 154(b) by 349 days.

(21) Appl. No.: 12/048,520

(22) Filed: Mar. 14, 2008

(51) Int. Cl.
*G01M 3/04* (2006.01)
(52) U.S. Cl. ...................................... 73/45.5
(58) Field of Classification Search .................. 73/45.5, 73/40
See application file for complete search history.

(56) References Cited

U.S. PATENT DOCUMENTS 5,142,874 A * 9/1992 Maric ......................... 62/49.2

2008/0075777 A1 * 3/2008 Kennedy ..................... 424/484

OTHER PUBLICATIONS

Skaff, et al., Abstract of Cryogenic Feed-Through Test Rig, submitted for consideration for the 2007 AIAA Joint Propulsion Conference in Nov. 2006.
Skaff, et al., Cryogenic Feed-Through Test Rig, AIAA Joint Propulsion Conference, AIAA 2007-5322, Jul. 2007.

* cited by examiner

*Primary Examiner*—Hezron Williams
*Assistant Examiner*—Rodney T Frank
(74) *Attorney, Agent, or Firm*—Pearne & Gordon LLP

(57) ABSTRACT

A test rig capable to test feed-throughs for cryogenic service is provided. The test rig permits testing feed-throughs under the actual pressure and cryogenic temperature conditions of the anticipated in-service application, without the risk of releasing volatile liquid cryogens in the event of leakage or catastrophic failure of the feed-through. Methods of using the test rig are also disclosed.

25 Claims, 10 Drawing Sheets

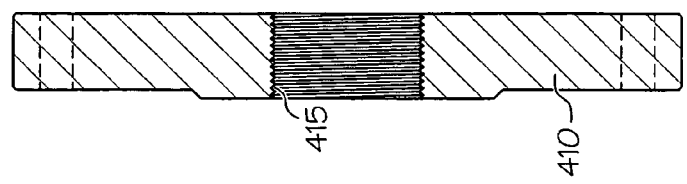
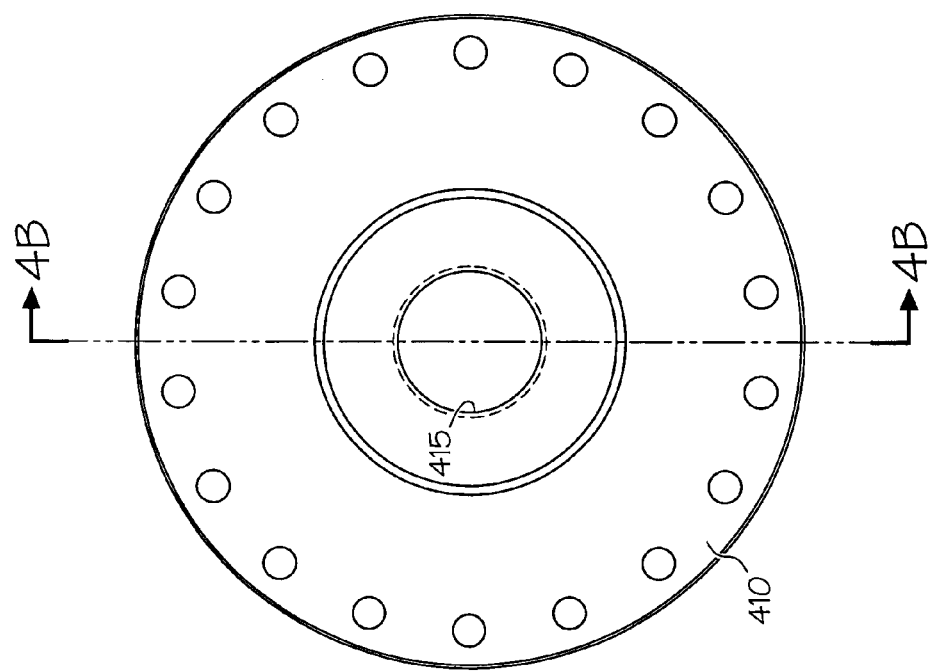

CRYOGENIC FEED-THROUGH TEST RIG

STATEMENT OF GOVERNMENT-SPONSORED RESEARCH

This invention was made with government support under Cooperative Agreement No. NS06AB34A awarded by the National Aeronautics and Space Administration, John C. Stennis Space Center. The government has certain rights in this invention.

BACKGROUND OF THE INVENTION

1. Field of the Invention

The present invention relates to the testing of feed-throughs for cryogenic and ambient service applications, and more particularly to a test rig for testing such feed-throughs under cryogenic temperature conditions.

2. Description of Related Art

Numerous applications require the use, storage and delivery of cryogenic liquids, including liquid hydrogen ($LH_2$), liquid oxygen (LOX) and liquid nitrogen ($LN_2$) to name a few, as well as the corresponding gases at cryogenic temperatures. These fluids are used as propellants, coolants and reagents in a wide variety of space-based and terrestrial applications. It is also often preferable to store certain normally gaseous (at standard temperature and pressure—"STP") fluids, e.g. those mentioned above, in the densified liquid state even if they are to be used in the gaseous state. This is because greater mass can be stored in a given volume in a liquid state compared to the gaseous state of the same fluid. Liquid-state storage and delivery/use of these fluids requires maintaining them at cryogenic temperatures. To measure and collect data as to the status of a cryogenic fluid (liquid or gaseous) as well as other system parameters, probes and other instrumentation often must contact or be provided in proximity to the cryogenic temperatures and fluids within the vessel or piping where it is stored or flowing. This means either the probe or instrumentation wires must traverse the cryogenic boundary to deliver instrumentation signals to a computer or other processing device on the outside. In a closed system, such probes typically are provided within the storage vessel (or piping) via feed-throughs disposed in the vessel (or piping) wall. A challenge in this area with respect to cryogenic fluids is the operating temperatures used, which are below 100K and can be as low as a few degrees Kelvin. To be effective, a cryogenic feed-through must not only be capable to withstand cryogenic operating temperatures, but it also must provide an effective seal at such temperatures under the prevailing pressure conditions.

As known in the field, a feed-through is a fitting that has a port or opening through which probes, transducers, their wires or other leads are allowed to penetrate the vessel wall (or vacuum jacket or piping), while providing a seal around the penetrating elements to protect the integrity (e.g. maintain pressure, inhibit leakage) of the vessel contents. Feed-throughs are commonly used in many fields including aeronautics, aerospace, biomedical, compressed gas, and many more. Better feed-throughs can improve data quality, data integrity, and the ease of installation. New feed-throughs can also increase sensor response time if sensors are mounted bare instead of being housed in sheaths that pass through the pressure boundary, such as swaged thermocouple sheaths. With a properly designed feed-through, probes and other instrumentation may be fed directly into a storage vessel or through another material boundary and be plugged directly into an electronics box, without the need for extra wires or solder connections inside the vessel or on the fluid side of that boundary. This will result in a significant reduction in complexity and cost, both in labor and materials, in many applications.

In the case of a cryogenic feed-through, which accommodates instrumentation or their wires for cryogenic fluids, the feed-through must be capable of withstanding the pressure gradients and cryogenic temperatures to which it will be subjected during actual use while maintaining an appropriate seal. As new cryogenic feed-throughs are developed to address the concerns in the preceding paragraph, the best way to ensure that they will perform under and withstand the anticipated operating conditions is to test and proof them under the same conditions. Unfortunately, however, manufacturers typically do not appear to do this. Instead, cryogenic feed-throughs appear to be rated for specific operating pressures and temperatures based on design calculations, ambient-temperature pressure testing or some combination of both. It is believed that cryogenic feed-throughs are not typically tested under cryogenic-temperature conditions due to the dangers associated with handling liquid cryogens, particularly if a candidate feed-through were to catastrophically fail or be ejected from a vessel full of liquid cryogen during a test. Where feed-throughs might be tested under cryogenic conditions, such testing is cumbersome and can be dangerous for these reasons. Furthermore, many feed-through manufacturers may not have the capability to pressure test their products at cryogenic temperatures.

The National Aeronautics and Space Administration (NASA) has many cryogenic test facilities that operate under a variety of extreme temperatures and pressures, all requiring feed-throughs to accommodate cryogenic-fluid instrumentation. Very few feed-throughs have been tested at the temperature and pressure extremes required by these centers. There is a need in the art for a test rig that will safely permit testing of cryogenic feed-throughs under cryogenic-temperature conditions at anticipated operating pressure gradients. Such a test rig preferably will permit one to quantify a leak rate of cryogenic fluid through the feed-through under operating conditions, and to correlate the leak rate with other parameters such as the pressure gradient across the feed-through. Such a test rig would be valuable for developing new types of cryogenic feed-throughs, which would be able to be tested under anticipated actual conditions of pressure and cryogenic temperature.

SUMMARY OF THE INVENTION

A feed-through test rig is provided, which includes a pressure vessel that defines a pressurant volume therein, and a cryogenic-bath vessel that defines a cryogen space for holding a liquid cryogen in use. The pressure vessel has a pressure-vessel opening that is adapted to be sealed at least in part by a feed-through that is to be tested under cryogenic conditions. The pressure vessel is at least partially received and accommodated within the cryogen space so as to immerse the received portion of the pressure vessel in a liquid cryogen during use. The pressurant volume and the pressure-vessel opening are isolated from the cryogen space.

A feed-through test rig is also provided, which includes a pressure vessel that defines a pressurant volume therein, a cryogenic-bath vessel that defines a cryogen space for holding a liquid cryogen in use, wherein the pressure vessel has a pressure-vessel opening that is adapted to be sealed at least in part by a feed-through that is to be tested under cryogenic conditions, and wherein the pressure vessel is at least partially received and accommodated within the cryogen space so as to immerse the received portion of the pressure vessel in a liquid cryogen during use, and wherein the pressurant volume and the pressure-vessel opening are isolated from the cryogen space; an enclosed environment surrounding the pressure-vessel opening and isolated from said cryogen space; a detector configured to detect the pressurant; and a pressurant-sniffer line provided in fluid communication between the enclosed environment and the detector to enable the detector to detect pressurant within the enclosed environment.

A feed-through test rig is also provided, which includes a cryogenic-bath vessel that at least partially defines a cryogen space for holding a liquid cryogen in use, a mounting ring disposed within the cryogenic-bath vessel and adapted to mate with a vessel flange, and a pressure vessel having a first end and a second end and defining a pressurant volume therein, the pressure vessel having a vessel opening at its first end through which the pressurant volume is accessible, and the pressure vessel being secured to the vessel flange adjacent the first end so that the vessel opening is accessible through a corresponding opening through the vessel flange; wherein on mounting the vessel flange to the mounting ring, the vessel flange cooperates to define the cryogen space and the second end of the pressure vessel extends and is accommodated within the cryogen space so as to immerse the second end in a liquid cryogen during use, and wherein on mounting the vessel flange to the mounting ring, the pressurant volume and the pressure-vessel opening are isolated from the cryogen space.

A method of testing a feed-through is also provided, which includes the following steps: providing a pressure vessel having a first end and a second end and defining a pressurant volume therein, the pressure vessel having a pressure-vessel opening at its first end through which the pressurant volume is accessible, wherein the second end of the pressure vessel is immersed in a liquid cryogen, and wherein the pressurant volume and the pressure-vessel opening are isolated from the liquid cryogen; sealing the pressure-vessel opening, wherein the seal is provided at least in part by a feed-through whose pressure integrity at cryogenic temperature is to be tested; enclosing an environment surrounding the pressure-vessel opening to provide an enclosed environment that is isolated from the liquid cryogen; pressurizing the pressurant volume with a pressurant until a desired pressure is reached, wherein the liquid cryogen provides a temperature sink effective to cause the pressurant within the pressurant volume to be at cryogenic temperature; and detecting any pressurant in the enclosed environment.

BRIEF DESCRIPTION OF THE DRAWINGS

FIG. 4a is a plan view of the vessel flange 320 from the side of vessel opening 310.

FIG. 4b shows plan and side views of the feed-through flange 410.

DETAILED DESCRIPTION OF PREFERRED EMBODIMENTS

Figure 1:
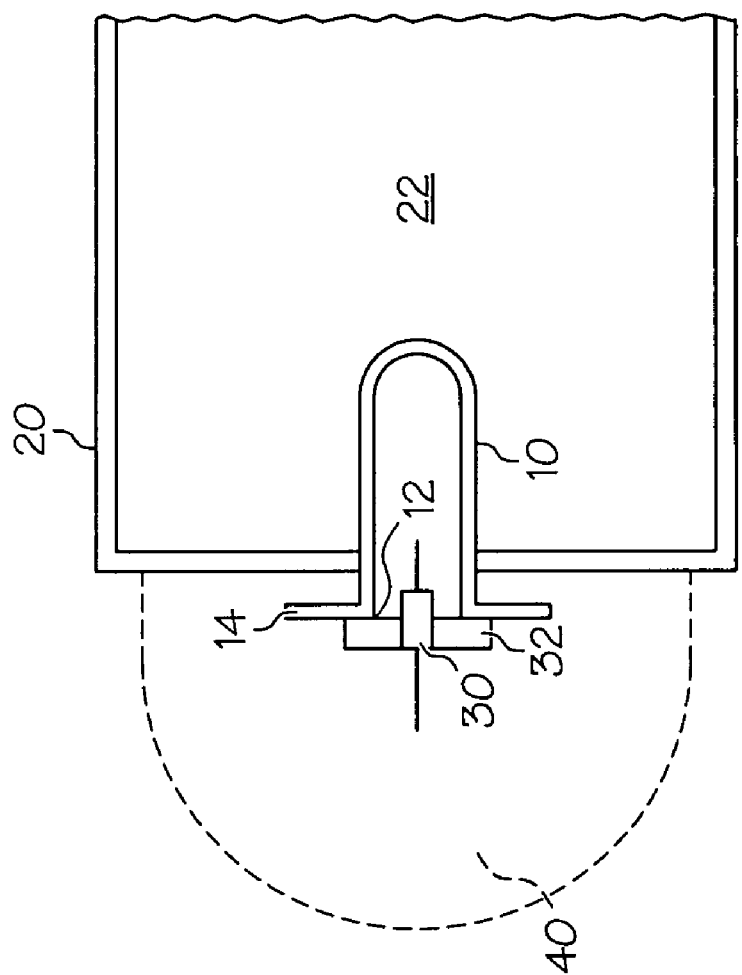
FIG. 1 is a simplified schematic view illustrating a pressure vessel and a cryogenic bath vessel of a test rig as herein disclosed, wherein a feed-through to be tested under cryogenic conditions is isolated from the cryogenic-bath.

The invention provides a test rig capable of subjecting a cryogenic feed-through to true cryogenic temperature conditions and a range of pressure gradients to proof and test the feed-through under the actual temperatures and pressures it would experience during operational use. A broad aspect of the invention is first described with reference to FIG. 1, which is schematic in nature and omits illustration of piping and instrumentation. As seen in FIG. 1, the invention includes a pressure vessel 10 and a cryogenic bath vessel 20. The cryogenic-bath vessel defines a cryogen space 22, which holds a liquid cryogen during use to provide a cryogenic-temperature bath. The pressure vessel has an opening 12 that is adapted to accommodate and be sealed (at least in part by) a feed-through 30 to be tested, as will be described shortly. The pressure vessel 10 penetrates the boundary of the cryogen space 22, leaving the opening 12 outside the cryogen space 22. Consequently, except for the portion of the pressure vessel 10 where the opening 12 is located, the pressure vessel 10 is disposed within the cryogen space 22, and consequently is immersed in a cryogenic bath consisting of a liquid cryogen when the test rig is being used. To test a feed-through 30, that feed-through is mounted to the pressure vessel 10 so as to seal off the opening 12. For example, the feed-through 30 to be tested may be secured to a feed-through flange 32, which can be bolted or otherwise secured via known or conventional means to a pressure-vessel flange 14 or mounting lip surrounding the opening 12. A suitable gasket (not illustrated in FIG. 1) should be used if necessary when sealing flanges to one another to ensure leak-tightness at the anticipated operating pressures and temperatures. The region outside the pressure vessel 10 and surrounding the feed-through 30 (outside environment 40) is sealed.

To conduct a test of the feed-through 30, the bath vessel 20 is filled with a liquid cryogen to achieve the desired cryogenic-temperature bath for the test in the cryogen space 22. The outside environment 40 is maintained at a constant pressure, typically under vacuum, and is equipped with a pressurant (preferably helium) sniffer to detect helium or other pressurant that leaks past the feed-through 30 and into the outside environment 40. Next, the pressure vessel 10 is pressurized with a pressurant such as gaseous helium. The pressure vessel 10 is filled with helium up to the pressure at which the feed-through is to be tested under cryogenic conditions. Because the pressure vessel 10 is substantially immersed in the cryogenic-temperature bath, the gaseous helium inside the pressure vessel 10 equilibrates at the cryogenic temperature of the bath. If desired, a heat exchanger may be used to cool the helium down to the bath temperature before it enters the pressure vessel 10. In addition, a cold wall or other suitable structure or methodology may be utilized to inhibit heat transfer from the outside environment to the feed-through 30, the feed-through flange 32 and other features in contact therewith to minimize subjecting the feed-through 30 to undesired temperature gradients. These and other additional features are described more fully below with respect to exemplary embodiments. Once the system has equilibrated under the test conditions (cryogenic temperature from the bath in cryogen space 22 and operating pressure of gaseous helium within the pressure vessel 10), the helium sniffer (e.g. mass spectrometer) is used to measure and quantify the rate at which helium leaks past the feed-through 30. This procedure and test rig permit not only proofing a feed-through 30 against failure at actual cryogenic temperatures, but also assessment of its leak-tightness under anticipated operating pressures at such temperatures.

Figure 2:
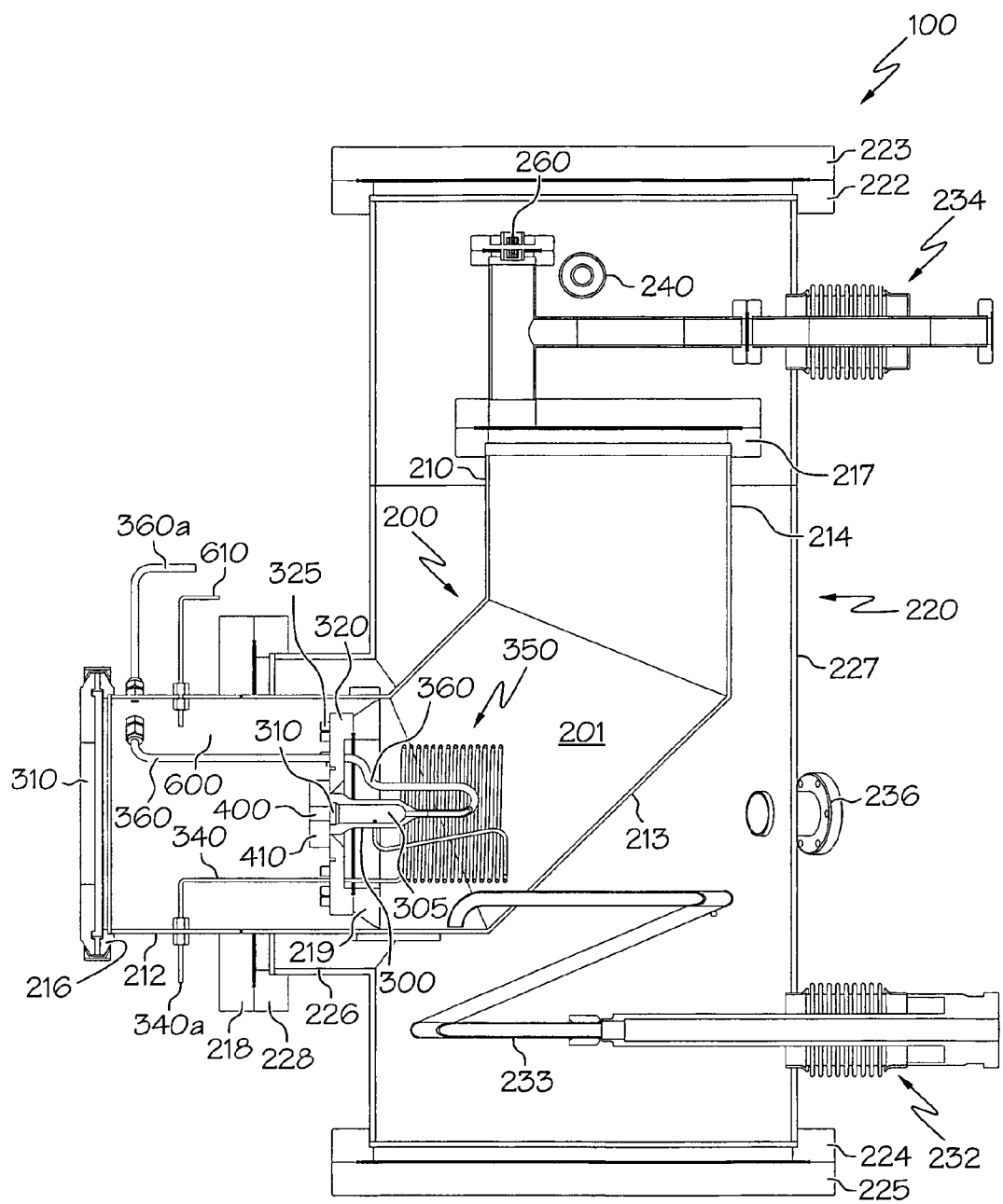
FIG. 2 is a side view, partially in section, of a feed-through test rig according to a first exemplary embodiment.

Referring now to FIGS. 2-4a, an exemplary embodiment will now be described in detail. FIG. 2 illustrates (in partial section) a test rig 100 fully assembled. The cryogenic bath assembly 200 is described first with reference to FIGS. 2 and 3. The bath assembly 200 includes a bath vessel 210 that is substantially disposed and housed within a vacuum chamber 220. In the illustrated embodiment, the vacuum chamber 220 is a section of pipe having upper and lower pipe flanges 222 and 224 that are sealed, respectively, by upper and lower sealing flanges 223 and 225. The vacuum chamber 220 also has a lateral pipe section 226 extending and forming a Tee from the main pipe section 227 thereof, which section 226 terminates in a lateral pipe flange 228. Cryogenic fill/drain and vent ports, 232 and 234, are provided in the main pipe section 227 wall to fill, drain and vent a cryogen from the bath vessel 210 once installed within the vacuum chamber 220, as further described below. A vacuum port 236 is also provided in the main pipe section 227 wall to enable a vacuum to be drawn in the vacuum chamber 220 once it is sealed. An instrumentation feed-through 240 can also be provided in the main pipe section 227 wall to accommodate instrumentation wires as will be further described.

The cryogenic-bath vessel 210 is provided as a pipe elbow in the illustrated embodiment. The bath vessel 210 is shown as a segmented pipe elbow, which can be assembled by cutting straight pipe sections at appropriate miter angles and then welding together the discrete sections of straight pipe. However, a continuous smooth pipe elbow also could be used. Whether a continuous (smooth curve) or segmented elbow, the bath vessel includes a lateral section 212 and a vertical section 214 that are joined by an intermediate elbow section 213. The lateral section 212 of the bath vessel terminates in a sealing collar 216 and the vertical section terminates in a sealing flange 217. Alternatively, both the lateral and vertical sections 212 and 214 can terminate in a sealing collar, a sealing flange, or one and the other as desired. As will become apparent below, the lateral 212 and vertical 214 sections of the bath vessel 210 will be isolated from one another and separately sealed via their respective flange(s)/collar(s), which will be required to withstand only modest pressure gradients (e.g. ≦50 psi) across the seal. So a fully-bolted, flanged seal may not be necessary.

Figure 3:
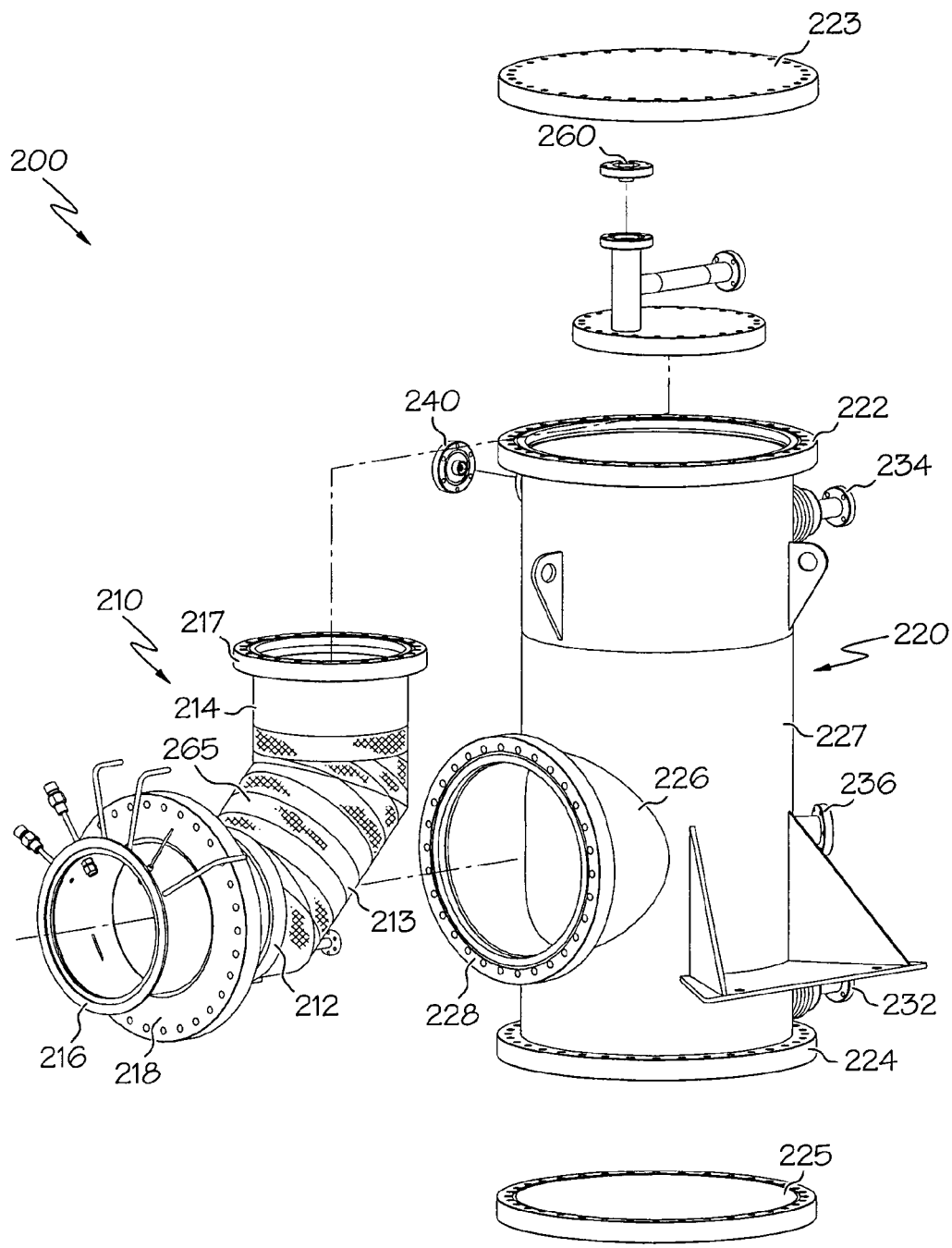
FIG. 3 is a perspective exploded view of the vacuum chamber and cryogenic bath vessel of the embodiment illustrated in FIG. 2.

The bath vessel 210 is dimensioned so that the vertical and elbow sections 214 and 213 have smaller diameters than the main pipe section 227 of the vacuum chamber 220, and the lateral section 212 has a smaller diameter than the lateral pipe section 226. This enables the bath vessel 210 to be received and accommodated within the vacuum chamber 220, with the elbow and vertical sections 214 and 213 housed within the main pipe section 227 and the lateral section 212 extending through and emerging from the lateral pipe section 226. Preferably, all the sections 212, 213 and 214 (and the sealing flange 217) have diameters that also can be accommodated by the lateral pipe section 226 of the vacuum chamber 220, which will permit the bath vessel 210 to be inserted into the vacuum chamber 220 vertical-section (214) first, through the lateral pipe section 226. A bath-mounting flange 218 is fitted over and sealed securely (preferably via welding) to the outer-diameter surface of the lateral section 212 of the bath vessel 210. The bath-mounting flange 218 is adapted to mate with the lateral pipe flange 228, to both seal the lateral pipe section 226 of the vacuum chamber 220 and to secure the bath vessel 210 in position therein. Optionally, a heating tape 265 or other heating element can be wrapped around or provided in contact or proximity with the bath vessel 210, particularly that portion thereof that helps to define the cryogen space 201. While the cryogen space 201 is filled with liquid cryogen and during a test, the heating tape 265 is de-energized and does not supply any heat. However, after the liquid cryogen has been drained from the cryogen space 201, the heating tape can be energized to emit heat to the bath vessel 210 and other cold or wetted components to accelerate warming the test rig components to room temperature where they can be manipulated or worked on if desired. Wrapping around the bath vessel 210 as illustrated in FIG. 3 is not required; the heating tape 265 may be provided in contact with the vessel 210 in any appropriate conformation to accelerate re-warming thereof after drainage of the liquid cryogen following a test.

Figure 4:
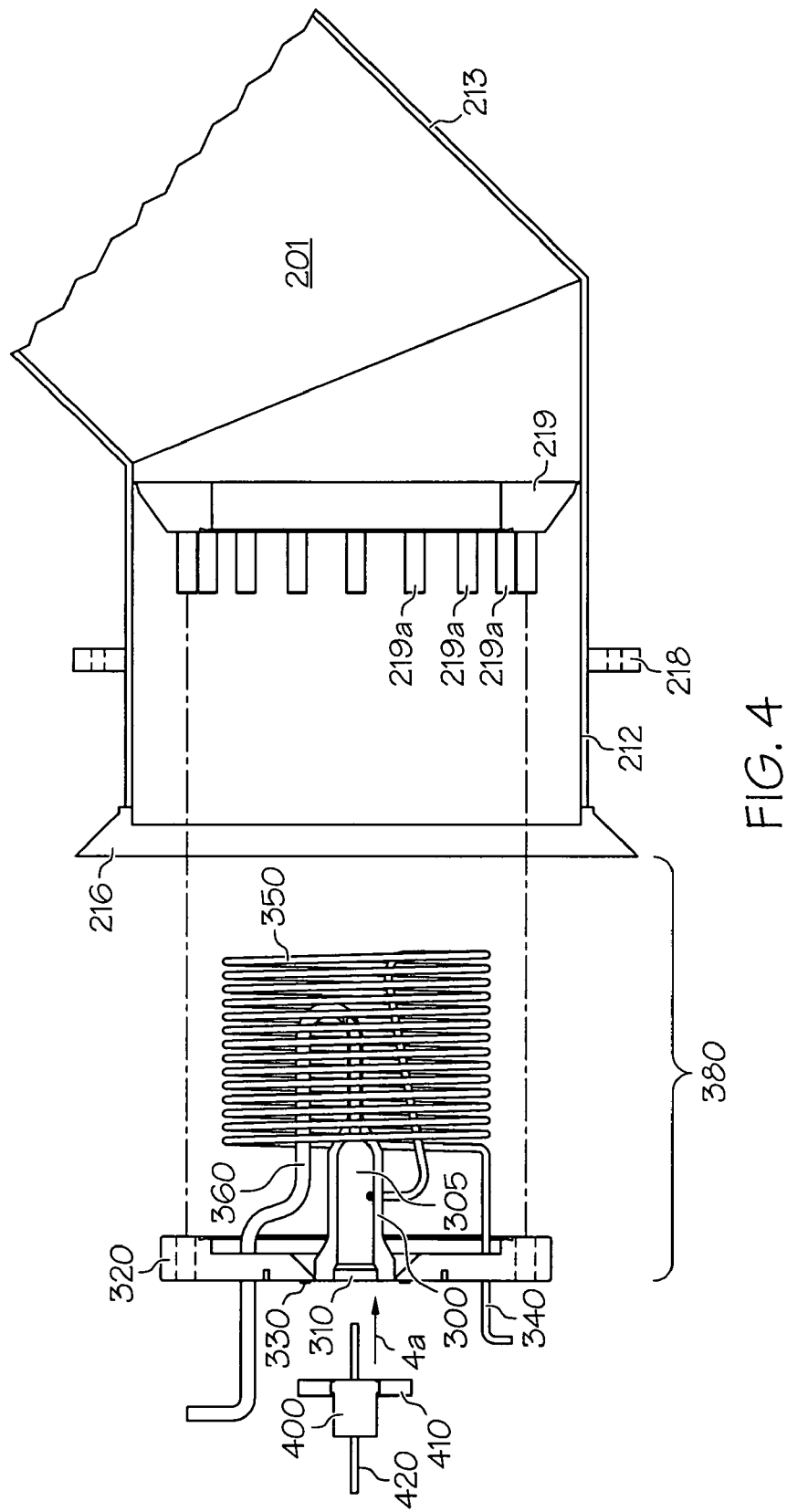
FIG. 4 is a close-up side view, in section, illustrating the fitment of the pressure vessel assembly 380 within the lateral section 212 of the bath vessel according to the embodiment of FIG. 2, wherein the pressure vessel 300 extends within the cryogen space 201 and the feed-through 400 remains isolated from the cryogenic bath.

Referring to FIG. 4, an annular mounting ring 219 is disposed within the inner diameter of the lateral section 212 of the bath vessel 210. The mounting ring 219 is sealed securely to the interior wall of the lateral section 212. The mounting ring 219 may be formed integrally with the lateral section 212, or it can be provided separately and welded therein. (Likewise, flanges disclosed herein may be formed integrally with the associated pipe or pipe section, or they can be provided separately and secured thereto as by welding). It is important that a leak-tight seal that can withstand cryogenic temperatures be provided between the mounting ring 219 and the interior wall of the lateral section 212, because that seal defines a boundary that is in direct contact with the liquid cryogen in the bath vessel 210 during use. A plurality of threaded studs 219a are arranged circumferentially and extend laterally from the outer face (face that faces away from a longitudinal axis of the vacuum chamber 220) of the mounting ring 219. The mounting ring 219 and associated studs 219a are adapted to mate with and retain a vessel flange 320, and thereby pressure vessel 300, as will now be described.

Still referring to FIG. 4, pressure vessel 300 is substantially closed at one end and has a vessel opening 310, through which the interior of the pressure vessel 300 (pressurant volume 305) is accessible, at the opposite end. The pressure vessel is secured to the vessel flange 320 adjacent the vessel opening 310, so that the opening 310 is accessible through a corresponding opening in the flange 320. It is important to note that the vessel opening 310 and the corresponding opening in the flange 320 are not necessarily distinct. For example, if the vessel 300 is welded about its opening 310 to or at one face of the flange 320 to provide a seal therebetween, then the opening previously drilled through or disposed in the flange may be considered a part of the interior surface of vessel 300 itself, and thus the opening therethrough would cooperate to define the vessel opening 310. A feed-through mounting lip 330 is disposed at the surface of the vessel flange 320 about the circumference of the opening therein (or vessel opening 310), and is adapted to mate and seal with feed-through flange 410 as described below. Although illustrated as a raised element, the mounting lip 330 need not necessarily be raised; for example, it may be flat relative to the remainder of the flange surface or have any other suitable configuration so long as it is adapted to mate and seal with the feed-through flange 410.

On insertion of the vessel flange 320 into the lateral section 212 of the bath vessel 210, it will be appreciated (and seen in FIG. 2) that the pressure vessel 300 is accommodated through the opening at the center of the mounting ring 219, so that vessel 300 extends within the cryogen space 201 that is defined in part by the lateral and elbow sections 212 and 213, the mounting ring 219, the vessel flange 320 and the pressure vessel 300 itself. That is, when assembled as illustrated in FIG. 2, these elements define, in part, a wetted boundary of the cryogen space 201 that will be in contact with liquid cryogen when it is introduced therein via the fill/drain port 232. The vessel flange 320 has a plurality of circumferentially-disposed through-bores aligned with the threaded studs 219a extending from the mounting lip 219. On mating the flange 320 with the mounting lip 219, the threaded studs 219a are accommodated through the corresponding through-bores in the flange 320, which is then secured to the mounting lip 219 using bolts 325 (seen in FIG. 2) in a conventional manner to provide a leak-tight seal. Alternatively, other known or conventional structure or methods to seal the vessel flange to the mounting lip 219 could be used. In one exemplary embodiment, they can be welded together. Welding will ensure zero leakage of liquid cryogen between the flange 320 and the mounting lip 219. Alternatively, if welding is to be used then no mounting lip 219 may be required, and the vessel flange 320 simply can be welded to the interior surface of the lateral section 212 of the bath vessel 200. Although it will ensure zero cryogen leakage, welding is generally less preferred than a reversible seal (such as a flanged seal with appropriate gasketing) because it will render it more difficult to change out the pressure vessel 300 as may be desirable from time to time or to test differently-sized feed-throughs 400 as more fully explained below.

A pressurant line 340 is provided in fluid communication with the pressurant volume 305 inside the pressure vessel 300 in order to deliver the helium or other pressurant that will be used to test the feed-through 400. In the illustrated embodiment, the pressurant line 340 passes through the vessel flange 320 from the outside environment 600 on its way to the pressure vessel 300. To accomplish this, preferably a hole is drilled through the flange 320, the pressurant line 340 is fed therethrough and then preferably welded therein to provide a seal. To ensure that gaseous helium (or other pressurant) is already fully equilibrated at the bath temperature before entering the pressure vessel 300, the length of the pressurant line 340 disposed in the cryogen space 201 and which will be immersed in the cryogenic bath (i.e. after passing through the vessel flange 320) may be extended so as to increase the residence time of the pressurant therein before reaching the pressure vessel 300. In the illustrated embodiment, such extension is achieved by winding the pressurant line 340 in a spiral configuration around and concentric with the pressure vessel 300, to provide a pressurant heat exchanger 350. By extending the length of the pressurant line 340 (and consequently the residence time of pressurant in the cryogenic bath), the removal of thermal energy from the pressurant is enhanced to further reduce its temperature nearer to that of the cryogenic bath before entering the pressure vessel 300. This is useful because if a feed-through fails during a test, ensuring constant pressurant temperature in the pressurant volume will help to ensure that any failure was primarily due to pressure effects and not to temperature effects, which for example may induce unanticipated or unquantifiable strains in the feed-through due to non-uniform thermal expansion. While a pressurant heat exchanger 350 having a spiral-wound configuration is illustrated, it will be appreciated that numerous other configurations of windings or to lengthen the pressurant line 340 path could be devised or utilized; it is not required that spiral windings be employed to so lengthen the pressurant line 340 to provide heat exchanger 350. Rather, such a configuration is simply convenient from the standpoint of assembling the test rig 100, because it can be easily inserted into the cryogen space 201 through the opening at the center of mounting ring 219 on insertion of the mounting flange 320 into lateral section 212 of the bath vessel 210 to mate with the mounting ring 219. In addition to the pressurant line 340, an instrumentation line 360 also can be disposed through the vessel flange 320 to conduct instrumentation leads or wires from thermocouples or other instruments disposed within the pressure vessel 300 (in pressurant volume 305) to take readings of the pressurant therein. The instrumentation line 360 can be disposed through the mounting flange 320 in the same manner described above for the pressurant line 340.

The pressure vessel 300, vessel flange 320 and pressurant line 340, together with the pressurant heat exchanger 350 and instrumentation line 360 if present, define a modular pressure-vessel assembly 380 that can be changed out of the test rig 100 depending on the feed-through 400 to be tested as well as other conditions. For example, it is desirable that the vessel opening 310 be at least as large as, and preferably larger than, the diameter of the particular feed-through 400 to be tested. It is also desirable to test feed-throughs 400 having the actual instrumentation, probes, wires, etc., that will be fed through them in use. Some such instrumentation or probes are larger than others, requiring a larger pressurant volume 305, and correspondingly a larger pressure vessel 300, to accommodate them.

As mentioned above, the feed-through mounting lip 330 is disposed at the surface of the vessel flange 300 about the circumference of the vessel opening 310, and is adapted to mate and seal with the feed-through flange 410. It is possible to provide a standardized feed-through flange 410 to mate with the mounting lip 330 of a particular pressure-vessel flange 320 (or pressure-vessel assembly 380). For example, a standard flange 410 may have an outer diameter corresponding to that of the lip 330 and also may have through bores correspondingly aligned with studs extending from the lip 330 (not shown). Such a standard feed-through flange 410 can be provided with a standardized threaded bore 415 (FIGS. 4a-4b), for example ¾" or ½" NPT or SAE threads, to accommodate a complementary male threaded fitting that has the feed-through 400 of interest secured thereto. Alternatively, the feed-through 400 itself may be provided as a male threaded fitting having a variety of standard thread configurations. Thus, it will be appreciated that a variety of feed-through flanges 410 can be provided, each having standardized female threading configurations, to provide a range of compatibility with numerous male-threaded feed-throughs 400 or, alternatively, numerous male threaded fittings to which feed-throughs 400 have been or can be secured. For additional flexibility, multiple pressure-vessel assemblies 380 can be provided, all having the same outer diameter of vessel flange 320 to correctly mate with the mounting lip 219, but having differently-sized and dimensioned pressure vessels 300, and correspondingly differently-sized vessel openings 310 and feed-through mounting lips 330. Each such pressure-vessel assembly 380 can be provided with a corresponding array of feed-through flanges 410 to accommodate differently-sized and threaded feed-throughs 400 or feed-through fittings as explained in this paragraph. As will be appreciated, the geometry and mode of fitting (i.e. threading configuration, absence of threading, etc.) a new feed-through 400 are designed based on the requirements of the end-use application, not to accommodate the test rig 100. Therefore, it is conceivable that for some feed-throughs 400 it will be necessary to simply weld it into a feed-through flange 410 that has been designed to accommodate the test rig 100, which can then be mounted to the feed-through mounting lip 330 of the flange 320. Preferably, the mode of fitting a feed-through in the test rig will be the same as (or approximate as much as possible) the mode of fitting the feed-through in the end-use application.

Regardless how the feed-through 400 is secured to the feed-through flange 410, as seen in FIG. 4 that flange 410 is secured to the flange feed-through mounting lip 330 of the flange 320 by known or conventional means; e.g. bolted connections with appropriate gasketing to ensure gas-tightness. The seal between the flanges 410 and 320 is of particular importance to ensure that gaseous helium (or other pressurant) is not permitted to leak past the seal under the pressures at which the feed-through 400 is to be tested. Moreover, it is important to ensure that the sealing mode that is used can withstand such pressures without leaking at the cryogenic temperatures that will be experienced during the test. One robust technique that has been discovered to provide a reliable high-pressure seal under cryogenic conditions employs a copper gasket in between opposed bolted flanges.

After the feed-through 400 and feed-through flange 410 have been installed, the environment surrounding them is sealed to provide an enclosed environment 600. In FIG. 2, a cap 310 is clamped and sealed to the sealing collar 216 of the lateral section 212 of bath vessel 210, thereby defining an enclosed environment 600 surrounding the exterior of the feed-through 400 opposite the pressure vessel 300. Appropriate fittings, such as Swagelok fittings, through the wall of lateral section 212 can be used to provide fluid communication between the pressurant and instrumentation lines 340 and 360 inside the enclosed environment 600 and the corresponding lines 340a and 360a located outside that environment 600 to conduct pressurant and instrumentation wires and probes from the outside into the enclosed environment 600 and the pressure vessel 300 as appropriate. Additional instrumentation can be introduced into the enclosed environment 600 via additional tubing and appropriate fittings through the lateral section 212 wall. Numerous such tubings and fittings are illustrated in FIG. 3, through the section 212 wall between the flange 218 and collar 216. Such tubings and fittings will be useful, for example, to apply a vacuum to the enclosed environment 600, to mount a pressure transducer or other gauge to record the pressure in that environment, and to supply a feed line for a mass spectrometer (not shown in the drawings) capable to detect helium should it leak past the feed-through 400 and into the environment 600 (i.e. a helium sniffer line 610). Referring to FIG. 2, instrumentation probes and lead wires also can be fed through the vacuum chamber wall, e.g. through feed-through 240 as shown, which may be used, for example, to monitor the vacuum in vacuum chamber 220 as well as to conduct wires for sensors provided within the cryogen space 201 (e.g. through further feed-through 260) to monitor the temperature, pressure and/or level remaining of the liquid cryogen therein.

Figure 5:
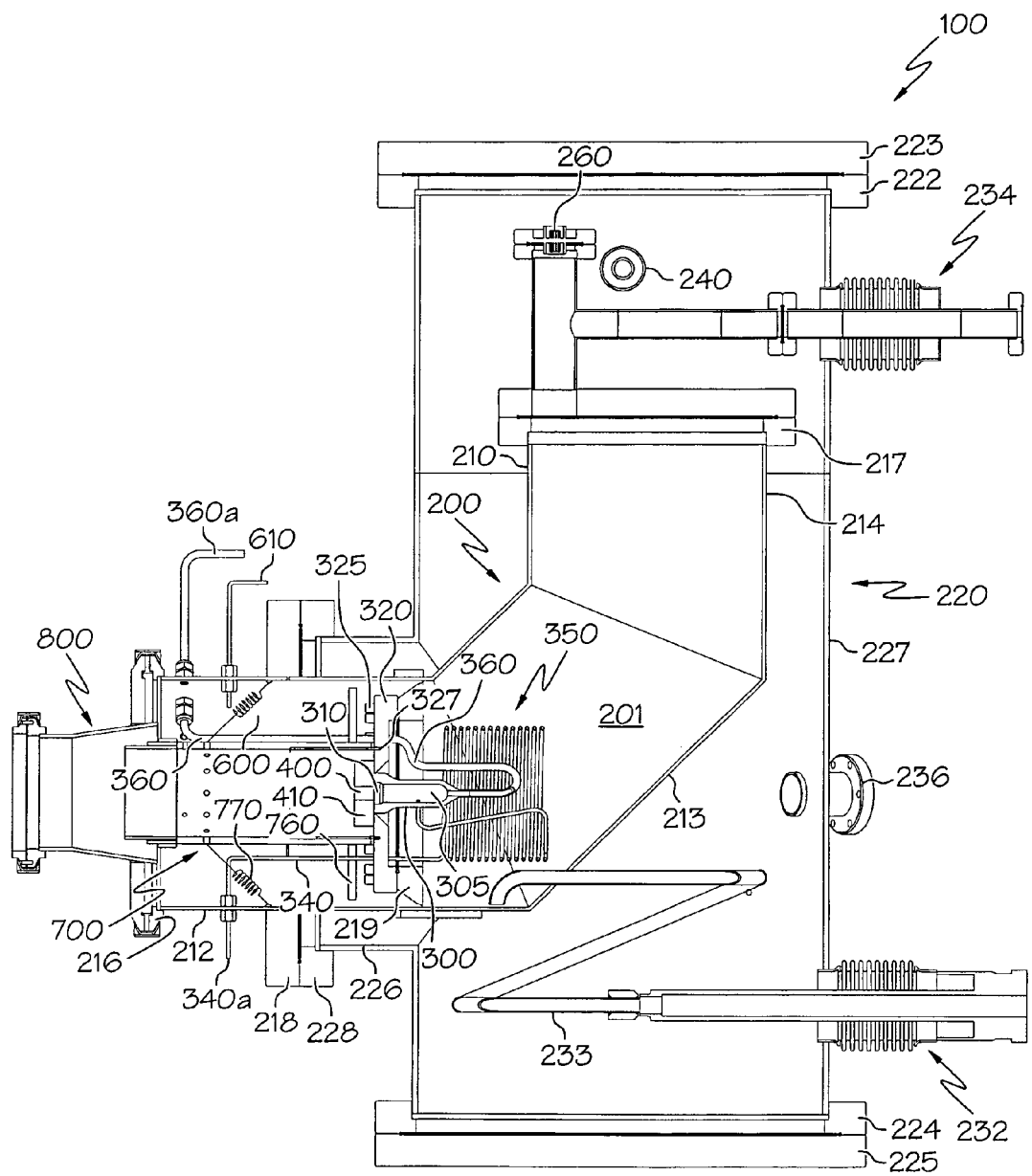
FIG. 5 is a side view, partially in section, of a feed-through test rig according to a second exemplary embodiment.
Figure 5A:
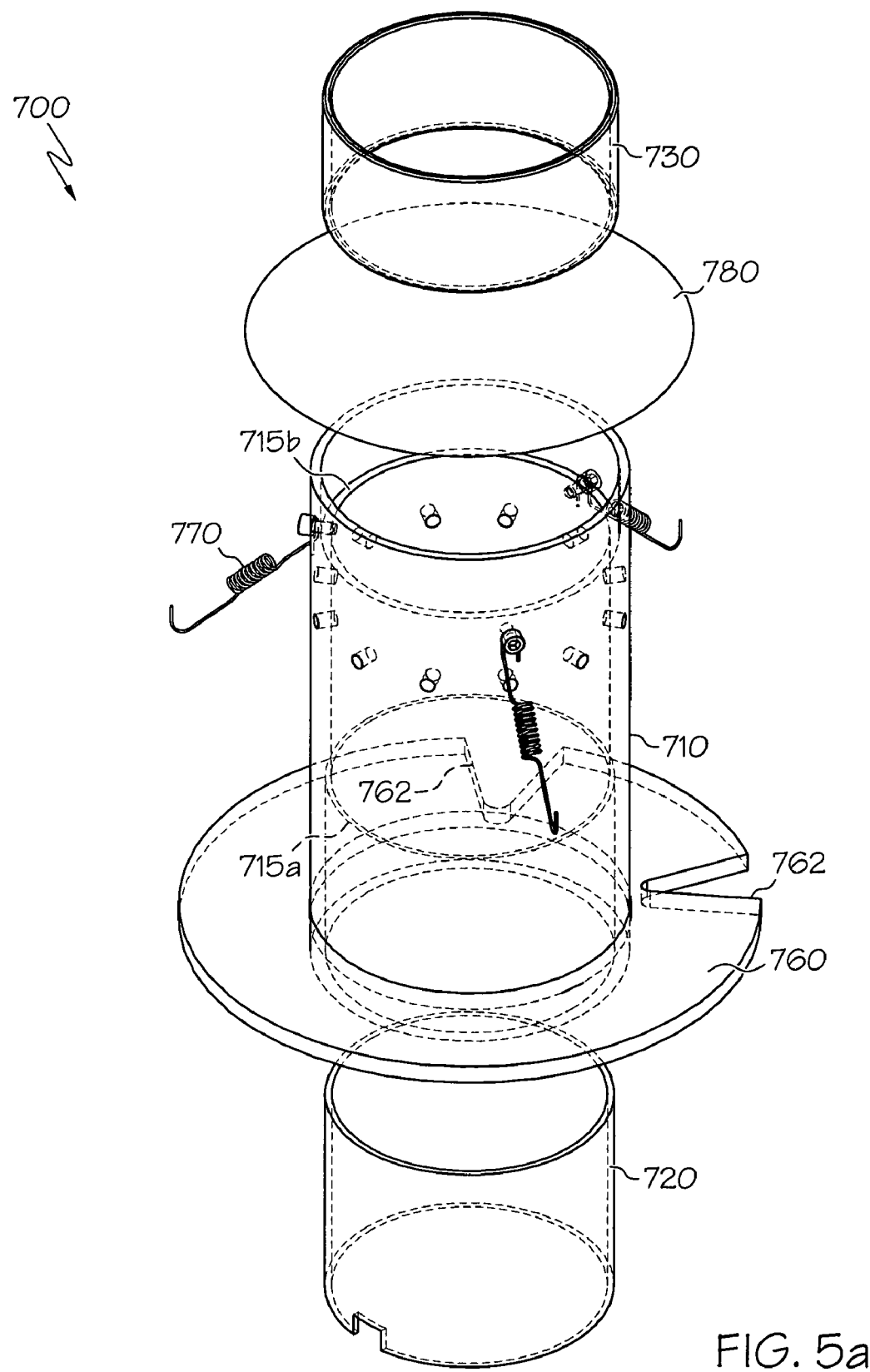
FIGS. 5a and 5b illustrate different views of an insulation assembly as in the embodiment illustrated in FIG. 5.
Figure 5B:
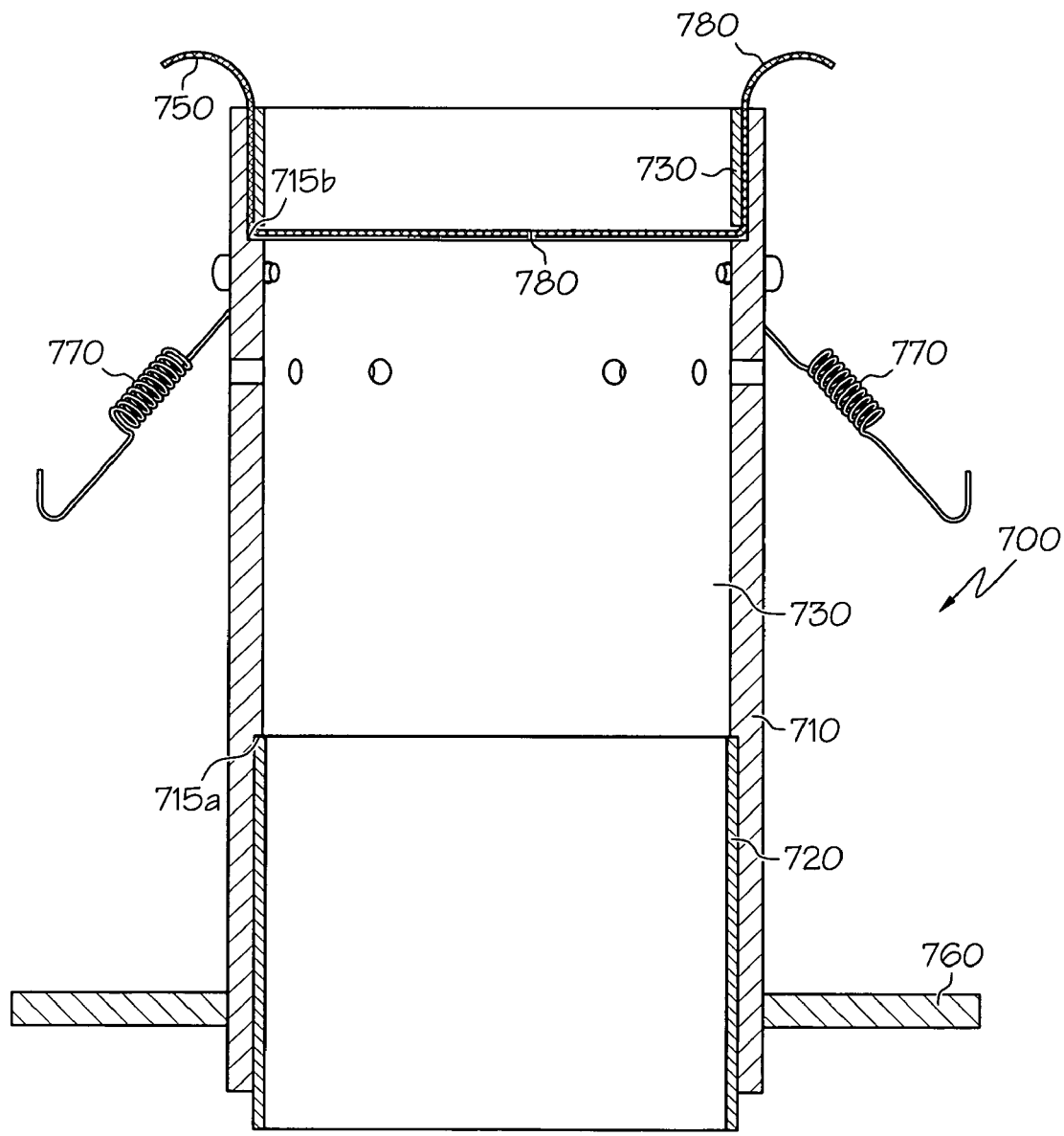

In a preferred embodiment, additional thermal insulation is provided within the enclosed environment 600 to minimize heat leak from the outside to the exterior portion of the feed-through 400 and correspondingly to minimize unanticipated or other temperature gradients in the feed-through 400 during the test. In operation, particularly in space-based applications, cryogenic-service feed-throughs 400 are surrounded by foam and other insulation and are consequently shielded from heat leak from the outside. It is desirable to create a similar test condition in the rig 100 when testing a feed-through 400. FIGS. 5, 5a and 5b illustrate a further exemplary embodiment that includes a thermal insulation assembly 700 disposed within the enclosed environment 600 to shield the feed-through 400 from ambient heat leak and promote an adiabatic test condition for the feed-through 400.

As best seen in FIGS. 5a and 5b, the insulation assembly 700 includes a cylindrical sleeve 710 made of a thermally-insulating material (preferably G-10 insulation) and having first and second inner diameters ("IDs") adjacent the longitudinal ends of the sleeve 710, and a third, smaller ID disposed longitudinally centrally within the sleeve 710, so that the smaller-diameter terminates in a lip 715a, 715b intersecting each of the respective first and second IDs. The first ID and corresponding lip 715a are adjacent the end of the sleeve 710 that is to be disposed adjacent the vessel flange 320 when installed (see FIG. 5). A cold-wall sleeve 720 having an outer diameter ("OD") that corresponds to the first ID of the sleeve 710 is inserted and disposed therein up until it abuts against the reduced-diameter lip 715a. The length of the cold-wall sleeve 720 is such that when it abuts the lip 715a at one end, it extends a short distance from the terminus of the sleeve 710 at its opposite end as seen in FIG. 5b. In this embodiment, a complementary groove 327 can be provided in the vessel flange 320 to receive the terminally-extending portion of the cold-wall sleeve 720 therein. Because the vessel flange 320 is in contact with the liquid cryogen on the opposite side during use, it is maintained at the cryogenic temperature and is effective to draw thermal energy from the cold-wall sleeve 720 via conduction to provide an active cold wall to insulate the feed-through 400 and feed-through flange 410 from ambient heat leak. The cold-wall sleeve 720 is made from a material having high thermal conductivity, preferably silver or copper, to maximize conduction of thermal energy to the flange 320. If desired, the ID surface of the cold-wall sleeve 720 can be painted black or provided with a black coating to improve the emissivity and absorptivity characteristics of that surface.

As seen in FIG. 5, the insulation assembly 700 is installed so that the feed-through flange 410 and the portion of the feed-through 400 extending into enclosed environment 600 are substantially enclosed within the cold-wall sleeve 720 and the cylindrical sleeve 710. Accordingly, the sleeve 720 (and consequently the sleeve 710) should have an ID at least large enough to accommodate the flange 410 and the feed-through 400. When installed, the terminally-extending portion of the cold-wall sleeve 720 contacts and is biased against the vessel flange 320, within groove 327 if present, by biasing springs 770. The springs 770 pull the outer sleeve 710 and—because of the sleeve 720-to-lip 325 abutment—the cold-wall sleeve 720 toward the flange 320. This ensures intimate surface-to-surface contact between the cold-walls sleeve 720 and the flange 320, to maximize heat transfer therebetween and provide an effective active-cooling cold wall surrounding the feed-through 400 to minimize ambient heat leak thereto during a test. Biasing springs 770 may be secured to the OD surface of the outer sleeve 710 via conventional means, for example they may be hooked to studs that are secured to that surface; alternatively they may be hooked through holes drilled through the sleeve 710. Similarly, the springs 770 may be secured to the interior surface of the lateral section 212, in tension to provide the described biasing force, via hooks or catches that can be welded or otherwise secured to that surface at appropriate locations.

An inner sleeves 730 made of insulating material (preferably G-10) also can be provided, having an OD corresponding to the second ID of the outer sleeve 710 as seen in FIGS. 5*a* and 5*b*. This inner sleeve 730 is received and disposed within the second ID of the outer sleeve 710 until it abuts the lip 715*b*. One or multiple sheets of insulating film 780 (e.g. mylar or MLI insulation) is/are disposed and sandwiched in between the sleeve 730 and the lip 715*b* to provide a sheet of thermally-reflective insulation substantially closing the ID of the sleeve 710 (i.e. extending transverse to the longitudinal axis of sleeve 710) and overlying the feed-through 400, to substantially enclose the feed-through 400 within the insulation assembly 700 and provide an additional barrier to ambient heat leak. If desired, mylar or MLI insulation also can be provided in between the outer sleeve 710 and any or both of the inner sleeves 720 and 730. In addition to insulation from ambient heat leak in the enclosed environment, the feed-through 400 is also subjected to conductive heat transfer directly into the cryogenic liquid via solid conduction through the feed-through flange 410 and the vessel flange 320, which form a solid thermally-conductive pathway between the feed-through 400 and the liquid cryogen in the cryogen space 201 during use. In addition, conduction through the gaseous pressurant within the pressurant volume 305 also conducts thermal energy away from the feed-through. All of the above effects, which can be used individually or combined (or some of them combined) in different embodiments, contribute to subjecting the feed-through 400 to cryogenic temperature during a test.

Preferably, an insulating ring 760 is disposed about and secured to the circumference (OD) of the outer sleeve 710 in a longitudinal position so that it will be located proximate the vessel flange 320 when the insulating assembly 700 is installed. The insulating ring 760 preferably has an OD that approaches but does not reach the ID of the lateral section 212, and preferably is coated on at least one side with a thermally-reflective material, such as MLI. This ring 760 provides an additional level of thermal insulation to cold components in the test rig 100 (e.g. feed-through 400, flange 410, flange 320) to minimize heat leak thereto from the ambient environment or from enclosed environment 600. In the illustrated embodiment, the ring 760 has cut-outs 762 to accommodate the pressurant and instrumentation lines 340 and 360 where they penetrate the vessel flange 320.

Figure 6:
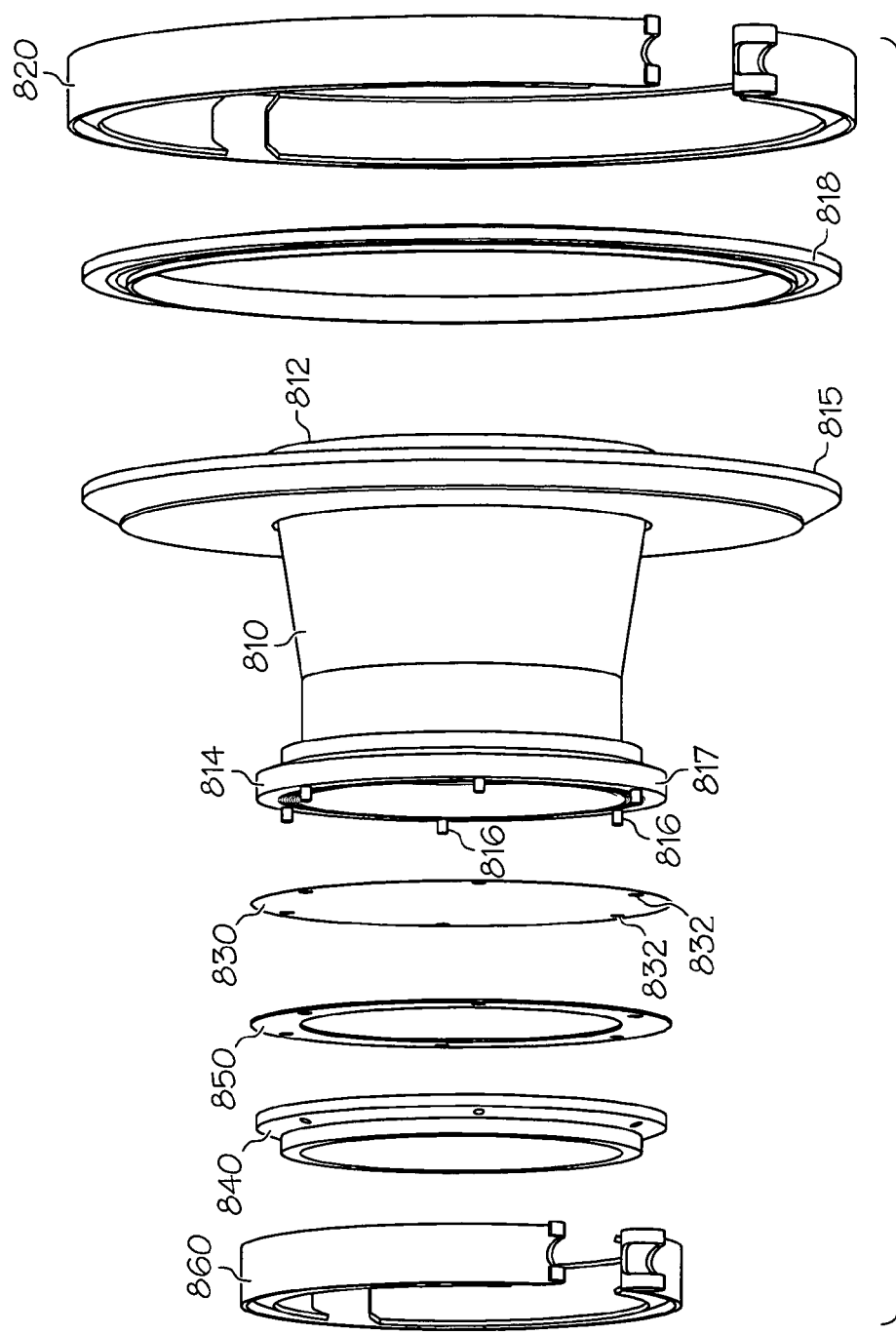
FIG. 6 is a centerline exploded view of a closure assembly as in the embodiment illustrated in FIG. 5
Figure 7:
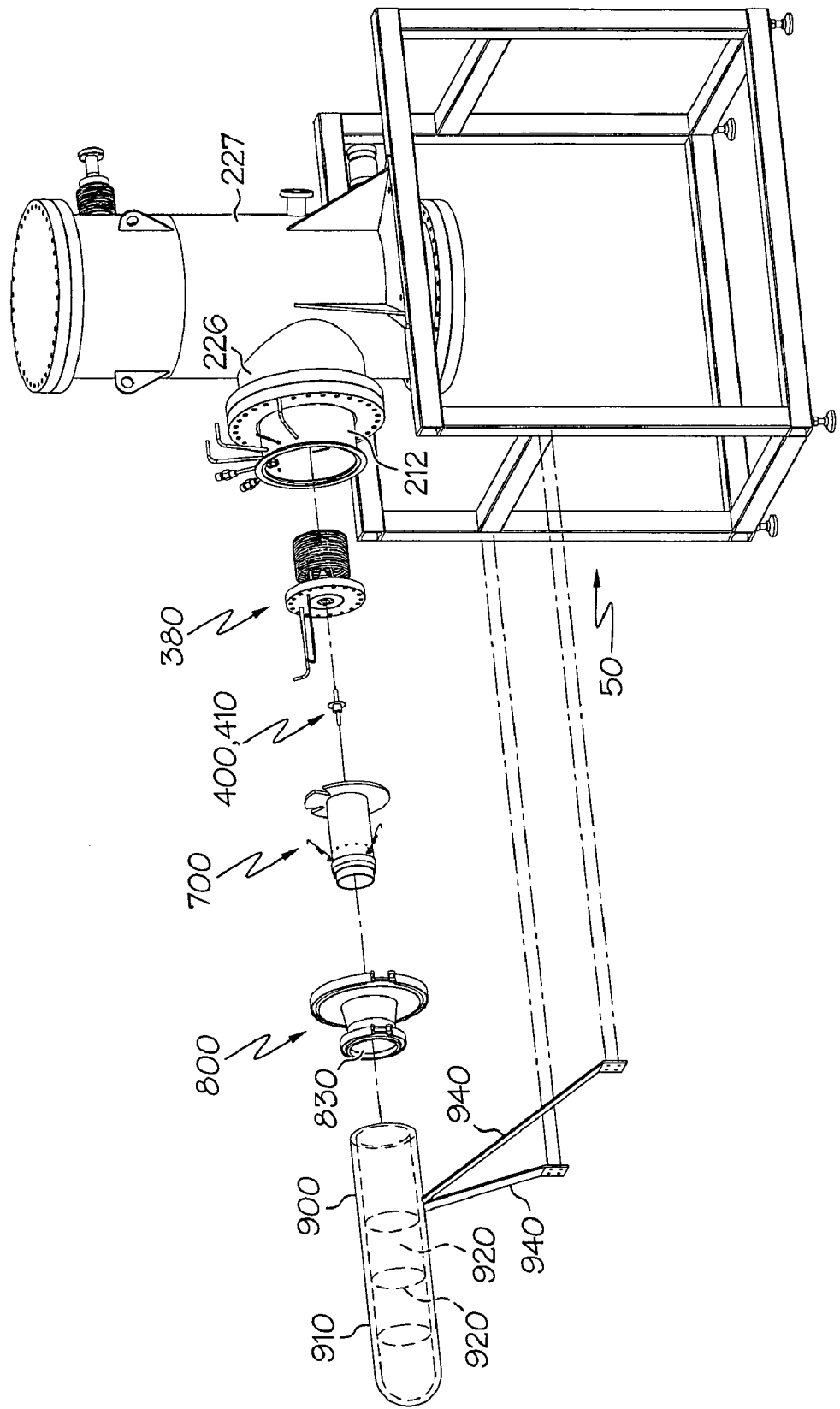
FIG. 7 is a centerline exploded view of a feed-through test rig similar to that illustrated in FIG. 5, except that it also includes a ballistic recovery assembly to recover an ejected feed-through for further study and analysis.

If the insulating assembly 700 extends beyond the terminus of the lateral section 212 of the bath vessel 210, then the cap 310 (from FIG. 2) can be replaced with a closure assembly 800 as shown in FIG. 5 to accommodate additional length of the insulating assembly 700. An exploded view of an exemplary embodiment of closure assembly 800 is shown in FIG. 6. As seen in FIG. 6, a reducer 810 is outfitted with a mating surface 815 adjacent its first end 812, which surface 815 is adapted to be secured to the sealing collar 216 via band clamp 820. The mating surface 815 can either be formed on an annular ring secured to the reducer 810 as illustrated, or alternatively it can be formed integrally with the reducer 810 at end 812. A suitable gasket 818 may be used to effectuate a gas-tight seal, recognizing that the pressure difference across the seal is to be nominally the difference between vacuum (within the environment 600) and the ambient atmosphere. At the second end 814 of the reducer 810, a diaphragm flange 817 is disposed, having a plurality of alignment pins 816 arranged circumferentially and extending from the surface thereof. A diaphragm 830 is adapted to be received on said diaphragm flange 817 and has a plurality of alignment holes 832 corresponding to the alignment pins 816, which are received therethrough on mounting the diaphragm 830 to the flange 817. The diaphragm 830 is secured to the diaphragm flange 817 via clamping flange 840 and silicone gasket 850, all of which are held together via a second band clamp 860. The diaphragm 830 can be a rigid metal piece or a burst disc. Alternatively, as in an embodiment where an ejected feed-through 400 is to be recoverable for further study (as illustrated in FIG. 7 and described below), the diaphragm can be a thin film layer, such as polyester, that is capable to withstand a modest pressure gradient to sustain the enclosed environment 600 under vacuum, while at the same time effective to readily break away on impact of an ejected feed-through 400 without damaging the latter. Optionally, the diaphragm material can be selected to be transparent to permit visualization of the feed-through 400 during a test, for example using a camera mounted outside of the enclosed environment 600.

In operation, once the environment 600 is completely enclosed (e.g. using either cap 310 or closure assembly 800), a vacuum is initially drawn on the enclosed environment 600 within lateral section 212. Once a vacuum has been established the mass spectrometer or other detector capable to detect the pressurant to be used (not shown) is activated and continues to draw a vacuum within the enclosed environment 600 through the sniffer line 610. The mass spectrometer should be configured to detect helium (or other pressurant) and to quantify the amount thereof drawn into the sniffer line. Mass spectrometers capable of doing this, and their configurations, are well known in the art and are not further described here. A vacuum is also drawn in the vacuum chamber 220, which serves to insulate the cryogen space 201, thus slowing boil-off and waste of the cryogen. The cryogenic liquid of choice (selected to produce the desired cryogenic temperature) is delivered into the cryogen space 201 via fill/drain port 232 and fill/drain line 233. Generally it is preferred to maintain the cryogenic liquid at atmospheric or ambient pressure because lower pressures result in lower saturation temperatures in the cryogen, and thus lower bath temperatures. For this reason, the cryogenic fluid is preferably vented through vent port 234 and is not maintained under pressure. Once the cryogen space 201 has been filled and the environment 600 evacuated, one can begin a test of the installed feed-through 400. Specifically, a quantity of helium or other pressurant (helium is assumed throughout the remainder of this disclosure) is fed via the lines 340*a*, 340 into the pressurant volume 305 within the pressure vessel 300. If a heat exchanger 350 is present, the helium is fed therethrough to more nearly equilibrate to the bath temperature before entering the pressure vessel 300. Pressure within the pressurant volume 305 can be monitored via pressure transducers or pressure gauges in fluid communication with the pressurant line 340*a* outside the test rig 100, which is maintained in communication with the pressurant volume 305. Once the desired pressure has been obtained, the pressure source is disconnected upstream of such pressure transducers/gauges to ensure the latter remain in fluid communication with the pressurant volume 305 to provide a real-time measure of gas pressure therein. If desired, thermocouples may also be disposed within the pressurant volume 305 via the instrumentation line 360 to provide real-time measure of the temperature profile therein during a test.

Once the desired pressure of helium has been fed to the pressure vessel 300, the mass spectrometer is monitored to determine if any helium leakage occurs past the feed-through 400, which would then enter the enclosed environment 600. Because the sniffer line 610 continuously draws a vacuum on the environment 600, any helium that leaks into that environment 600 will be drawn into the sniffer line 610 and ultimately into the mass spectrometer to be quantified. As known in the art, conventional mass spectrometers incorporate emergency shut-off valves to isolate the spectrometer in case a substantial instantaneous change in pressure is detected, which might damage the spectrometer's delicate components such as its turbo pump or molecular pump. The mass spectrometer used in conjunction with the test rig 100 should be so equipped in order to protect the mass spectrometer in the event of a catastrophic failure of the feed-through 400 under high pressure, which may result in a significant pressure wave being released into the enclosed environment 600.

In one test methodology, the cryogenic temperature is set using the desired cryogen in the cryogen space 201, and the pressure is incrementally increased in fixed steps, e.g. 50 psi each, until the desired final test pressure is reached. Each time the pressure is increased a step, it is held there and the system monitored for a period of time, e.g. 5 minutes or some other appropriate time interval, to determine if the feed-through 400 is leaking (and if so, at what rate) as well as to ensure non-failure at the specific pressure. For example, if the anticipated in-service pressure is 500 psia at 20K, then an appropriate cryogen is selected to approximate the 20K temperature and a test protocol may be used based on 10 equal-magnitude steps of 50 psi each, with a period of time permitted for equilibration and helium detection within the environment 600 (to determine leakage) after each step, until the in-service pressure is reached. If a factor of safety is desired beyond the anticipated in-service pressure, then the stepwise test protocol is simply continued until the desired factor has been achieved (e.g. 600 psia for a F.O.S. of 1.2).

Using the above-described test rig 100, feed-throughs designed for cryogenic service at high pressure can be tested for leakage and proofed against failure under the actual temperature and pressure conditions of the in-service application, without the risk of releasing volatile liquid cryogens in the event of leakage or catastrophic failure of the feed-through 400. Because the pressurant volume 305 and the vessel opening 310 are isolated from the cryogen space 201, the cryogen that supplies the temperature bath does not come into contact with the feed-through 400 at any time. Consequently, if the feed-through 400 leaks or even catastrophically fails and is ejected, only the pressurant within the vessel 300 (helium) can leak into or be discharged into the environment 600 or the laboratory. The liquid cryogen that provides the cryogenic temperature sink for the test is physically isolated from the feed-through 400, and will not leak or be discharged into the environment 600 or the laboratory as a result of leakage past or failure of the feed-through 400. Nor is the liquid cryogen stored or used under pressure, meaning that substantial dangers associated with handling such highly volatile fluids under pressure are avoided. The principal safety precaution to be taken with respect to the cryogenic bath is to ensure adequate venting. With the present test rig 100, this can be easily and predictably achieved because the cryogenic bath is maintained at ambient pressure. Consequently, no special equipment or extraordinary precautions are necessary beyond those for the normal handling of cryogens at low pressure, which precautions may be required if uncontrolled release of liquid hydrogen or liquid oxygen under high pressure were possible as a result of feed-through failure during a test.

An additional benefit of the present test rig 100 is that helium can be easily detected and its leakage past the feed-through quantified by mass spectrometry, providing a ready means of rating feed-throughs for leak rate based on the conditions of the test; e.g., in standard cubic centimeters per second ("SCCS") of helium at the selected pressure gradient ($\Delta P$ between the pressurant volume 305 and the environment 600) and cryogenic temperature. Finally, in the event of a catastrophic failure, such as the feed-through 400 being ejected from the pressure vessel 300, only a small amount of helium (that present in the pressurant volume 305 and associated pressurant lines 340,340a) will be emitted into the environment 600 and potentially into the laboratory or workshop. However, as will be appreciated, because helium is inert and due to the small volume involved, even a high-pressure failure will not be chemically dangerous and will produce a pressure wave that dissipates within a few feet. Hence, the primary safety concern with respect to operating the test rig 100 is to ensure that personnel remain a sufficient distance away from the test rig 100 to avoid eardrum injury from the helium pressure wave that may be generated in the event of a catastrophic feed-through failure.

Hence, for safety the test rig 100 should be isolated, and preferably the lateral pipe section 226 (and lateral section 212) pointed away from lab personnel, during a test. To avoid damaging the test rig in the event of a catastrophic failure, the cap 310 can be provided as a burst disc. Alternatively, a sheet of film can be used so long as it is capable to withstand a pressure gradient of ~15 psi (vacuum within the environment 600 compared to ambient pressure of about 14.7 psi at sea level). If a closure assembly 800 is used, then diaphragm 830 may be provided as a burst disc or sheet of film that will give way if it encounters a substantial pressure wave. This will protect the lateral section 212 of the bath vessel 210 from rupture in the event of catastrophic feed-through failure, but may result in ejecting feed-through components through the burst disc or film of the cap 310 or diaphragm 830 at high velocity. This presents additional reason to ensure the lateral section 212 is pointed away from lab personnel, and preferably in a direction having a safe background; i.e. devoid of people or equipment that might be damaged on impact of an ejected feed-through 400 or feed-through piece.

In the event of a catastrophic failure resulting in ejection of the feed-through 400, it may be desirable to study the failed feed-through 400 (or its remnants if in pieces), for example to subject it/them to a stress or structural analysis to determine the mode of failure. FIG. 7 illustrates a further exemplary embodiment that has been configured to permit salvaging an ejected feed-through 400 and to minimize damage thereto from an impact after it is ejected. Specifically, a ballistic recovery assembly 900 is aligned with the anticipated trajectory of an ejected feed-through 400, opposite the diaphragm 830. In the illustrated embodiment, the ballistic recovery assembly 900 includes a rigid outer shell or tube 910 that is open at one end; i.e., the end facing the feed-through 400. The interior volume of the tube 910 is filled with a plurality of cylindrical foam blocks 920, preferably having diameters that correspond to the ID of the tube 910. An ejected feed-through 400, guided by the insulation assembly 700, will follow a trajectory through the diaphragm 830 (which easily breaks away) and into the foam blocks 920 disposed within the tube 910. The foam is selected so as to absorb the impact energy of the ejected feed-through 400 or feed-through components. The foam is provided in distinct blocks 920 instead of as a single solid foam cylinder because it is believed this may make extraction of an ejected feed-through 400 from the tube 910 easier. In an alternative embodiment, the terminal end of the tube 910, opposite the open end facing the feed-through, may be capped with a removable end cap (not shown), which may also make retrieving the ejected feed-through easier. As seen in FIG. 7, the tube 910 can be secured to a stand 50 that supports the test rig 100, and maintained in appropriate alignment therewith via mounting arms 940. In a further embodiment, a ballistic recovery assembly can be adapted from similar recovery systems conventionally used to recover bullets for forensic firearm analysis and identification. One company that specializes in designing such systems is Ballistics Research Inc. of Alpharetta, Ga. Ballistics Research manufactures such a system under the name Duke Projectile Recovery System™ to recover high-velocity bullets undamaged. It is believed this or a similar system may be adaptable to be used as the ballistic recovery assembly 900 described above.

Finally, while not discussed above, when sealing two flanges or other features to provide a gas-tight and/or liquid-tight seal, including at cryogenic temperatures and elevated pressures, if the seal is reversible (e.g. other than a welded seal, such as a flanged seal maintained by bolting) it is important to use appropriate gaskets or other sealing aids as commonly known and available in the art, which are suitable for the particular temperature and pressure service. One type of gasket that has been found by the inventors to be quite reliable to maintain a gas-tight gasket seal under cryogenic temperature conditions is a copper gasket as described above. Alternatively, other gasketing materials known in the art and effective to maintain a tight seal under the prevailing conditions may be used. Such gaskets and gasket materials, and gasket seals generally, are well known in the art and are not further described here. Unless otherwise expressly indicated, conventional gasket materials suitable for the prevailing temperature and pressure conditions may be used when providing any compression seal (such as a bolted-flange seal) in the test rig 100.

Finally, it is to be noted, as will be recognized by persons of ordinary skill in the art, that the various embodiments disclosed and illustrated herein are not necessarily mutually exclusive. That is, features from one disclosed embodiment may be combined with features of another disclosed embodiment to provide a test rig within the scope of the invention.

Although the hereinabove described embodiments of the invention constitute the preferred embodiments, it should be understood that modifications can be made thereto without departing from the scope of the invention as set forth in the appended claims.

What is claimed is:

1. A feed-through test rig comprising a pressure vessel that defines a pressurant volume therein, and a cryogenic-bath vessel that defines a cryogen space for holding a liquid cryogen in use, said pressure vessel having a pressure-vessel opening that is adapted to be sealed at least in part by a feed-through that is to be tested under cryogenic conditions, said pressure vessel being at least partially received and accommodated within said cryogen space so as to immerse the received portion of said pressure vessel in a liquid cryogen during use, said pressurant volume and said pressure-vessel opening being isolated from said cryogen space.

2. The test rig of claim 1, further comprising a pressurant line in fluid communication with said pressure vessel, said pressurant line following a path from outside the cryogenic-bath vessel, into and through said cryogen space prior to entering or coupling to said pressure vessel to deliver pressurant into said pressurant volume.

3. The test rig of claim 2, said pressurant line entering or coupling to said pressure vessel within said cryogen space.

4. The test rig of claim 2, further comprising a pressurant heat exchanger disposed within said cryogen space, said heat exchanger being configured to enlarge the residence time, in said cryogen space, of pressurant that is flowed through said pressurant line, thereby promoting equilibration of said pressurant at cryogenic temperature prior to entering the pressurant volume.

5. The test rig of claim 4, said pressurant heat exchanger comprising a length of said pressurant line wound in a spiral configuration.

6. The test rig of claim 1, further comprising a ballistic recovery assembly aligned with an anticipated trajectory of a feed-through ejected from said pressure-vessel opening during a test.

7. A feed-through test rig comprising:
a pressure vessel that defines a pressurant volume therein;
a cryogenic-bath vessel that defines a cryogen space for holding a liquid cryogen in use, said pressure vessel having a pressure-vessel opening that is adapted to be sealed at least in part by a feed-through that is to be tested under cryogenic conditions, said pressure vessel being at least partially received and accommodated within said cryogen space so as to immerse the received portion of said pressure vessel in a liquid cryogen during use, said pressurant volume and said pressure-vessel opening being isolated from said cryogen space;
an enclosed environment surrounding said pressure-vessel opening and being isolated from said cryogen space;
a detector configured to detect said pressurant; and
a pressurant-sniffer line provided in fluid communication between said enclosed environment and said detector to enable said detector to detect pressurant within said enclosed environment.

8. The test rig of claim 7, said detector being a mass spectrometer.

9. The test rig of claim 7, said enclosed environment being configured to sustain a vacuum in use.

10. The test rig of claim 7, further comprising a feed-through at least partially sealing said pressure-vessel opening and thereby isolating said pressurant volume from said enclosed environment.

11. A feed-through test rig comprising:
a cryogenic-bath vessel that at least partially defines a cryogen space for holding a liquid cryogen in use, a mounting ring disposed within said cryogenic-bath vessel and adapted to mate with a vessel flange, and
a pressure vessel having a first end and a second end and defining a pressurant volume therein, said pressure vessel having a vessel opening at said first end through which said pressurant volume is accessible, said pressure vessel being secured to said vessel flange adjacent said first end so that said vessel opening is accessible through a corresponding opening through said vessel flange;
wherein on mounting said vessel flange to said mounting ring, said vessel flange cooperates to define said cryogen space and said second end of said pressure vessel extends and is accommodated within said cryogen space so as to immerse said second end in a liquid cryogen during use,
and wherein on mounting said vessel flange to said mounting ring, said pressurant volume and said pressure-vessel opening are isolated from said cryogen space.

12. The test rig of claim 11, said vessel opening being at least partially defined by said opening through said vessel flange.

13. The test rig of claim 11, further comprising an enclosed environment surrounding said pressure-vessel opening and being isolated from said cryogen space, a detector configured to detect a pressurant used to pressurize the pressure vessel in use, and a pressurant-sniffer line provided in fluid communication between said enclosed environment and said detector to enable said detector to detect pressurant within said enclosed environment.

14. The test rig of claim 13, said enclosed environment being at least partially defined by a portion of said cryogenic-bath vessel that extends beyond said mounting ring and beyond said cryogen space.

15. The test rig of claim 11, further comprising a cold-wall sleeve made of a thermally-conductive material, said cold-wall sleeve being in contact with and biased against a surface of said vessel flange about said pressure-vessel opening.

16. The test rig of claim 15, further comprising an first insulating sleeve made of a thermally-insulating material, said cold-wall sleeve being received within said first insulating sleeve such that a portion thereof extends from a terminus of said first insulating sleeve to contact said vessel flange as described in claim 14, and second and third insulating sleeves made of thermally-insulating material, said second and third insulating sleeves also being received within said first insulating sleeve and sandwiching at least one sheet of thermally-reflective insulation therebetween so that said sheet of thermally-reflective insulation extends transverse to a longitudinal axis of said first insulating sleeve across the inner diameter thereof.

17. The test rig of claim 16, further comprising an insulating ring disposed about and secured to an outer surface of said first insulating sleeve in a longitudinal position located proximate the vessel flange.

18. The test rig of claim 13, further comprising:
 a mounting lip disposed on said vessel flange adjacent said pressure-vessel opening, feed-through flange and
 a feed-through flange adapted to mate with said mounting lip, said feed-through flange having a feed-through to be tested mounted therein;
 wherein on mounting said feed-through flange to said mounting lip, said pressurant volume within said pressure vessel is sealed from said enclosed environment, at least in part by said feed-through that has been mounted in said feed-through flange.

19. The test rig of claim 11, further comprising a pressurant line that sealingly penetrates said vessel flange and is in fluid communication with the pressurant volume of said pressure vessel, wherein a portion of said pressurant line upstream of said pressure vessel is wound into a spiral configuration substantially around said pressure vessel so that on mounting said vessel flange to said mounting ring, said spiral-wound portion of said pressurant line is accommodated within said cryogen space so as to be immersed in a liquid cryogen during use.

20. The test rig of claim 11, said cryogenic-bath vessel being a substantially elbow-shaped vessel having a vertical section, and elbow section and a lateral section, at least said vertical and elbow sections being substantially enclosed within a vacuum chamber, said vacuum chamber having a lateral pipe section that terminates in a lateral pipe flange, said lateral section of said cryogenic-bath vessel having a bath-mounting flange secured to an outer surface thereof so that said cryogenic-bath vessel is installed in said vacuum chamber by insertion thereof, vertical-section-first, into said vacuum chamber through said lateral pipe section and then securing in place by mating said bath-mounting flange to said lateral pipe flange.

21. The test rig of claim 11, further comprising a ballistic recovery assembly aligned with an anticipated trajectory of a feed-through ejected from said vessel opening during a test.

22. The test rig of claim 21, said ballistic recovery assembly comprising an outer tube that is open at one end, and one or a plurality of foam blocks disposed within said outer tube to absorb impact energy of an ejected feed-through or feed-through components.

23. A method of testing a feed-through comprising:
 providing a pressure vessel having a first end and a second end and defining a pressurant volume therein, said pressure vessel having a pressure-vessel opening at said first end through which said pressurant volume is accessible, said second end of said pressure vessel being immersed in a liquid cryogen, said pressurant volume and said pressure-vessel opening being isolated from said liquid cryogen;
 sealing said pressure-vessel opening, wherein the seal is provided at least in part by a feed-through whose pressure integrity at cryogenic temperature is to be tested;
 enclosing an environment surrounding said pressure-vessel opening to provide an enclosed environment that is isolated from said liquid cryogen;
 pressurizing said pressurant volume with a pressurant until a desired pressure is reached, wherein the liquid cryogen provides a temperature sink effective to cause the pressurant within the pressurant volume to be at cryogenic temperature; and
 detecting any pressurant in said enclosed environment.

24. The method of claim 23, wherein said enclosed environment is maintained under vacuum, and the presence of any pressurant in said enclosed environment is detected through mass spectrometry.

25. The method of claim 23, wherein a thermally-conductive, solid pathway is provided between said feed-through and said liquid cryogen to promote conductive heat transfer therefrom into said liquid cryogen.

* * * * *